(12) United States Patent
Lee (10) Patent No.: US 7,750,258 B2
(45) Date of Patent: Jul. 6, 2010

(54) PEDAL DEVICE WITH FUNCTION OF ADJUSTING PEDAL EFFORT

(75) Inventor: Kwanghyuck Lee, Busan (KR)

(73) Assignee: Donghee Industrial Co., Ltd., Ulsan (KR)

( * ) Notice: Subject to any disclaimer, the term of this patent is extended or adjusted under 35 U.S.C. 154(b) by 230 days.

(21) Appl. No.: 12/114,783

(22) Filed: May 4, 2008

(65) Prior Publication Data
US 2008/0283372 A1 Nov. 20, 2008

(30) Foreign Application Priority Data
May 15, 2007 (KR) ............... 10-2007-0047177

(51) Int. Cl.
*H01H 9/26* (2006.01)
(52) U.S. Cl. ................. 200/61.89; 200/86.5
(58) Field of Classification Search ........... 200/61.89; 74/513
See application file for complete search history.

(56) References Cited

U.S. PATENT DOCUMENTS

| | | | |
|---|---|---|---|
| 6,474,191 B1 * | 11/2002 | Campbell | 74/514 |
| 7,278,337 B2 | 10/2007 | Solta | |
| 7,296,494 B2 | 11/2007 | Caba et al. | |
| 2007/0137400 A1 * | 6/2007 | Campbell | 74/513 |
| 2008/0276750 A1 * | 11/2008 | Kim et al. | 74/513 |

FOREIGN PATENT DOCUMENTS

| JP | 11-342762 A | 12/1999 |
|---|---|---|
| KR | 10-2005-0048817 A | 5/2005 |
| KR | 10-2006-0016380 A | 2/2006 |

* cited by examiner

*Primary Examiner*—Edwin A. Leon
*Assistant Examiner*—Lisa Klaus
(74) *Attorney, Agent, or Firm*—LRK Patent Law Firm (57) ABSTRACT

A pedal device for adjusting pedal effort includes a housing fixed to a car body, a pedal arm that is hinged about the housing, an elastic member that is disposed between the housing and the pivot end of the pedal arm and provides a return force to the pedal arm, a pedal effort adjusting unit that is movably disposed in the housing and has a sloped portion for adjusting a pre-compression force to the elastic member, and a pre-compression force setting unit that sets a fixed position of the pedal effort adjusting unit with respect to the housing and keeps a pre-compression force applied to the elastic member at a predetermined level. With this configuration, the pedal device can adjust the reaction force applied to the driver pressing the pedal corresponding to the driver's driving propensity, thereby improving the operability and reducing the fatigue of the driver's ankle.

14 Claims, 12 Drawing Sheets

PEDAL DEVICE WITH FUNCTION OF ADJUSTING PEDAL EFFORT

CROSS-REFERENCE TO PRIORITY APPLICATION

The benefit of priority is claimed to Republic of Korea patent application number 10-2007-0047177, filed May 15, 2007, which is hereby incorporated by reference in its entirety.

BACKGROUND

1. Field of the Invention

The present invention relates a pedal device of a vehicle, particularly a pedal device that reduces difference in the pedal response due to the driver's driving propensity and fatigue of the ankle due to a repeated operation of the pedal, by adjusting the elastic force of a return spring providing a return force to the pedal arm.

2. Description of the Related Art

In general, a vehicle traveling is accelerated when the driver presses the pedal device and the pedal device is frequently pressed by the driver while the vehicle is traveling; therefore, research to improve the pedal response is being conducted.

Further, the pedal device for acceleration is mainly divided into a mechanical type and an electronic type. The mechanical acceleration pedal device includes an acceleration pedal that is pivotably mounted inside the vehicle room, a throttle mechanism that is provided in the intake system in the engine room, and a cable that is provided to transmit an operational force between the acceleration pedal and the throttle mechanism, connecting them.

On the other hand, an electronic acceleration pedal device includes an acceleration pedal that is pivotably mounted in the vehicle room, a pivot angle detecting sensor, such as a potentiometer, which is attached to the acceleration pedal to detect in real time the amount of pivots of the acceleration pedal.

However, in the acceleration pedal devices as described above in the related art, according to the mechanical acceleration pedal device, a hysteresis, when a reaction force applied to the driver pressing the pedal is smaller than a reaction force applied to the driver releasing the pedal due to the friction between a wire and a tube in the cable at the same time the pedal is being pressed and released, is caused. However, this has minimal effect on tuning the pedal effort.

On the contrary, according to the electronic acceleration pedal device in the related art, the amount of reacting force applied when the driver presses or releases a pedal depends on only the natural elasticity of the return spring that elastically returns the pedal arm, and the amount of reacting force is set on the basis of the pressing force for acceleration rather than on the basis of the releasing. Therefore, the electronic acceleration pedal device that generates the same magnitude of reacting force while pressing and releasing the pedal in the related art, increases the fatigue of the driver's ankle as the driver repeatedly presses and releases the pedal. As a result, this deteriorates the response of the pedal.

Further, since the reacting force depends on the natural elasticity of the return spring in the electronic acceleration pedal device in the related art, it is difficult to freely perform the tuning of pedal effort according to the driver's preference.

SUMMARY

In order to overcome the above problems, an object of the present invention is to an electronic pedal device that detects the level of stepping by pressing a pedal in an electrical signal, which makes it possible to adjust the reaction force applied to the driver pressing the pedal to correspond to the driver's driving propensity by adjusting the pre-compression force against the return spring providing the return force to the pedal arm such that the operability is improved and the fatigue of the driver's ankle is reduced, and corresponds to the requirements of the driver by appropriately adjusting the reaction force.

In order to achieve the objects of the invention, a pedal device with a function of adjusting pedal effort includes: a housing that is fixed to a car body; a pedal arm that is hinged to the housing and pivots about the housing; an elastic member that is disposed between the housing and the pivot end of the pedal arm and provides a return force to the pedal arm; a pedal effort adjusting unit that is movably disposed in the housing and has a sloped portion for adjusting a pre-compression force to the elastic member; and a pre-compression force setting unit that sets a fixed position of the pedal effort adjusting unit with respect to the housing and keeps a pre-compression force applied to the elastic member at a predetermined level.

The elastic member is a coil spring composed of a large-diameter spring and a small-diameter spring that is coaxially disposed at a predetermined distance inside the large-diameter spring.

The pedal effort adjusting unit includes an outer sliding member having first sloping bodies on the lower side to adjust the pre-compression force to the large-diameter coil spring, and an inner sliding member having a second sloping body on the lower side to adjust the pre-compression force to the small-diameter coil spring.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION

Hereinafter, embodiments of the invention are described in detail with reference to the accompanying drawings.

Figure 1:
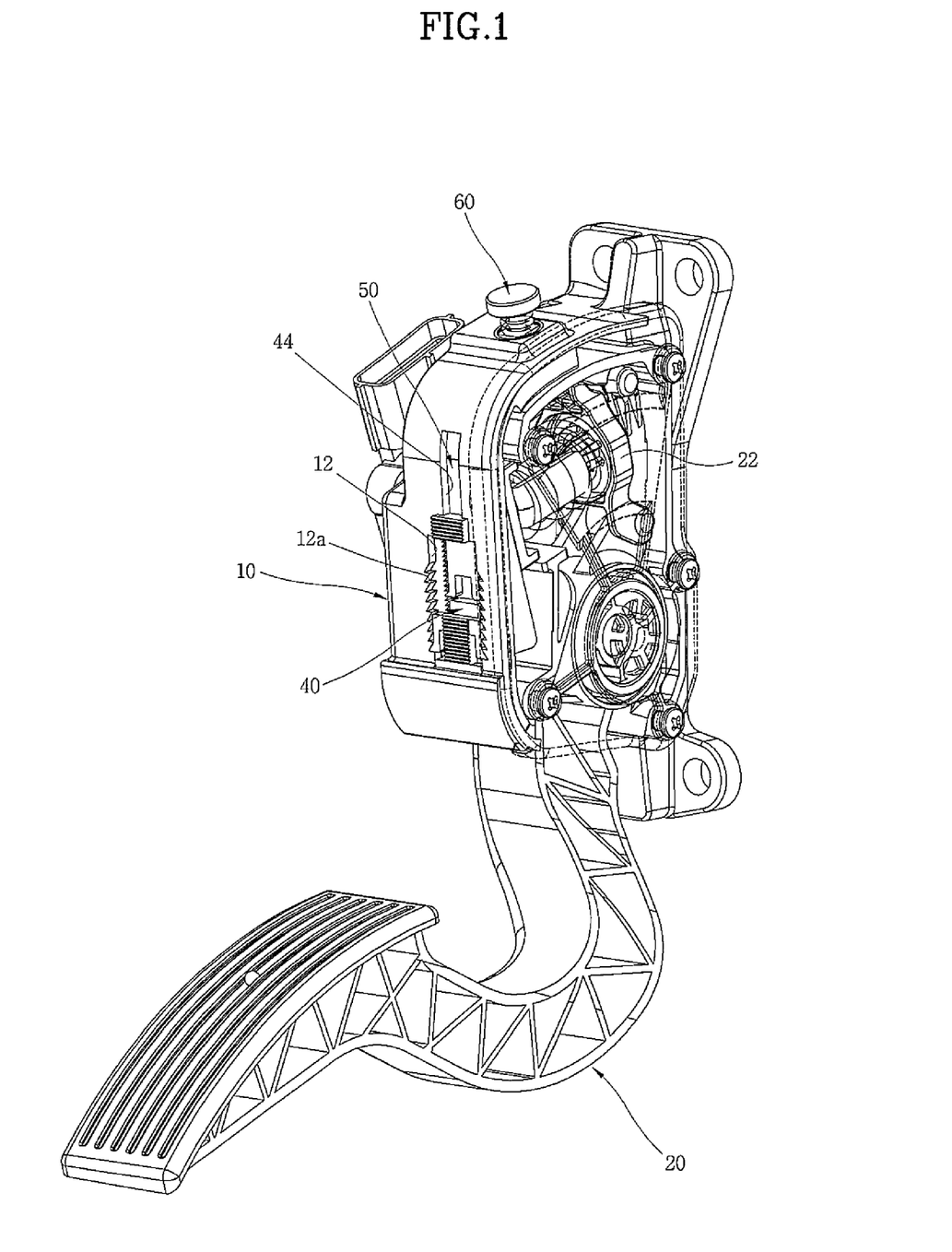
FIG. 1 is a perspective view illustrating the configuration of a pedal device with a function for adjusting pedal effort according to an embodiment of the invention.
Figure 2:
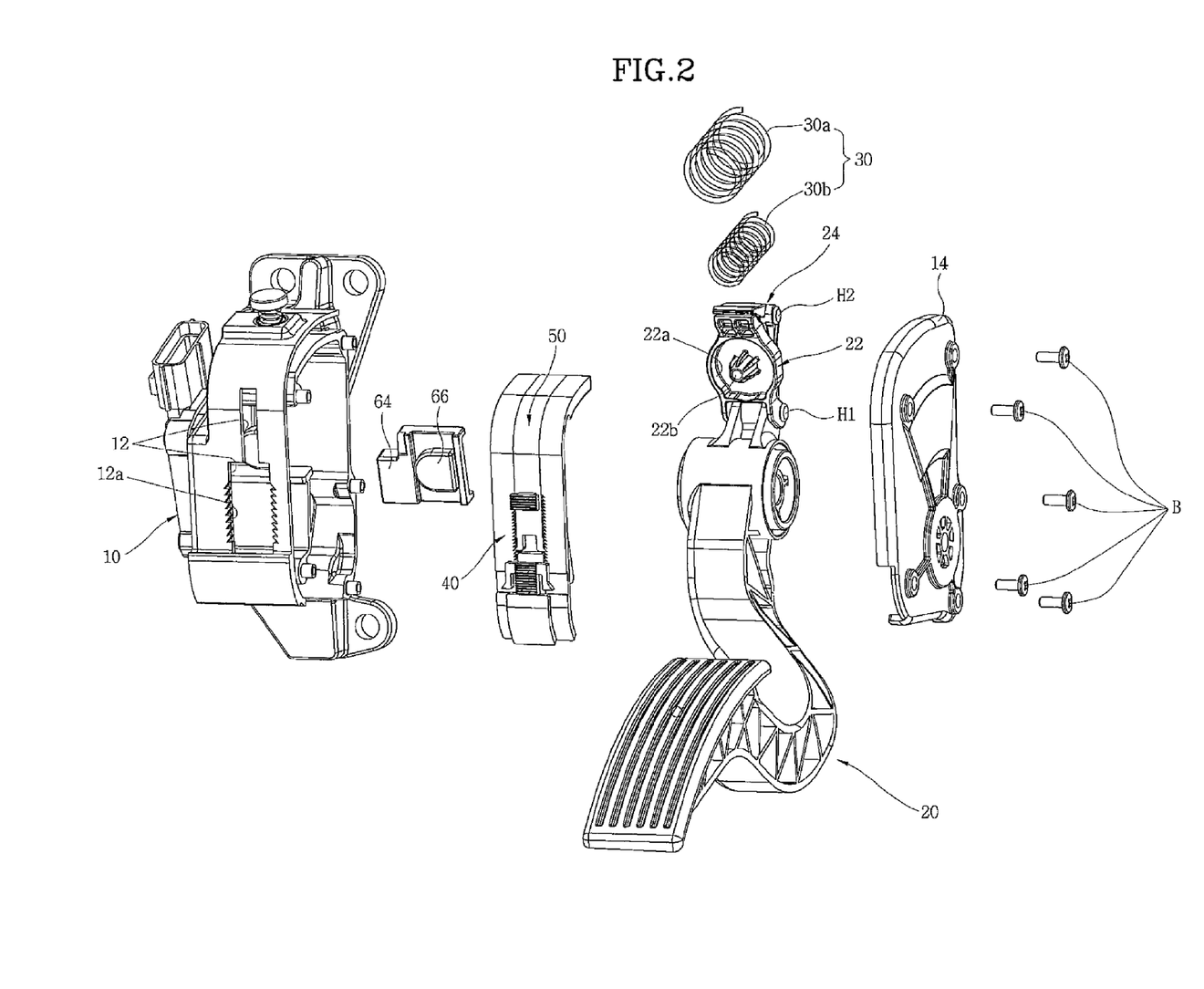
FIG. 2 is an exploded perspective view of FIG. 1.

As shown in FIGS. 1 and 2, an electronic pedal device according to an embodiment of the invention includes a housing 10 that is fixed to a car body, a pedal arm 20 that is hinged to the housing 10 and pivots about the housing 10, and an elastic member that is disposed between the housing 10 and the pivot end of the pedal arm 20 and provides a return force to the pedal arm 20. Further, the electronic pedal device according to an embodiment of the invention further includes a pedal effort adjusting unit and a pre-compression force setting unit. The pedal effort adjusting unit is movably disposed in the housing 10 and presses an end of the elastic member to adjust a pre-compression force to the elastic member, thereby adjusting a pedal effort to the pedal arm 20. The pedal effort adjusting unit has a sloped portion for adjusting the pre-compression force to the elastic member, such that the pre-compression force applied from the sloped portion to the elastic member is differently adjusted, depending on a fixed position of the pedal effort adjusting unit with respect to the housing 10.

Further, the pre-compression force setting unit is disposed in the housing to set the fixed position of the pedal effort adjusting unit and keeps the pre-compression force applied to the elastic member from the sloped portion of the pedal effort adjusting unit at a predetermined level. That is, after the pre-compression force applied to the elastic member by the pedal effort adjusting unit is adjusted, the pre-compression force setting unit keeps the pre-compression force applied to the elastic member at a predetermined level by fixing the position of the pedal effort adjusting unit with respect to the housing 10. The elastic member is composed of a double coil spring 30 disposed between the housing 10 and the pivot end of the pedal arm 20, and in detail, the coil spring 30 is composed of a large-diameter spring 30*a* and a small-diameter spring 30*b* that is coaxially disposed at a predetermined distance inside the large-diameter spring 30*a*.

Figure 3:
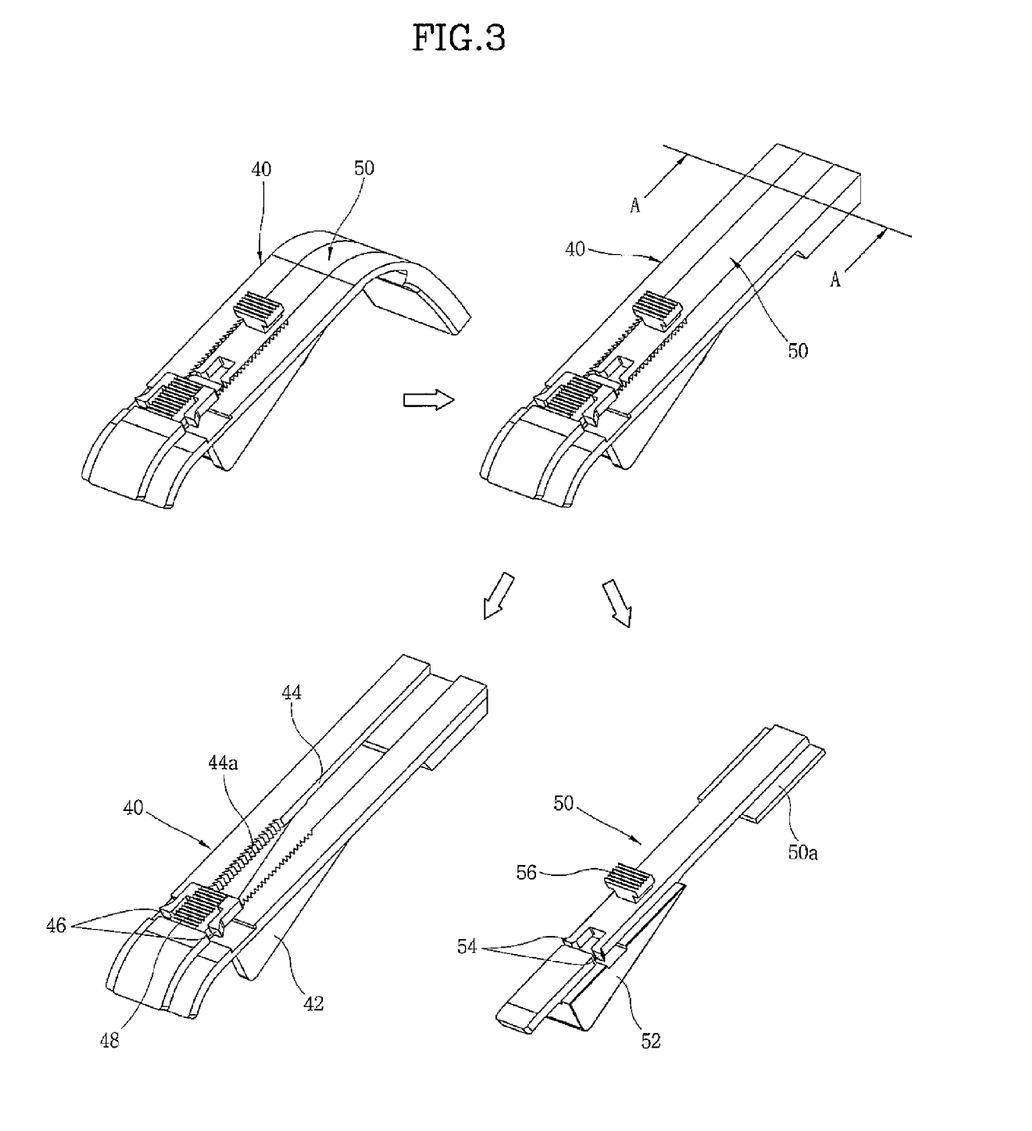
FIG. 3 is a perspective view illustrating assembling and disassembling the outer sliding member and the inner sliding member shown in FIG. 2.
Figure 4:
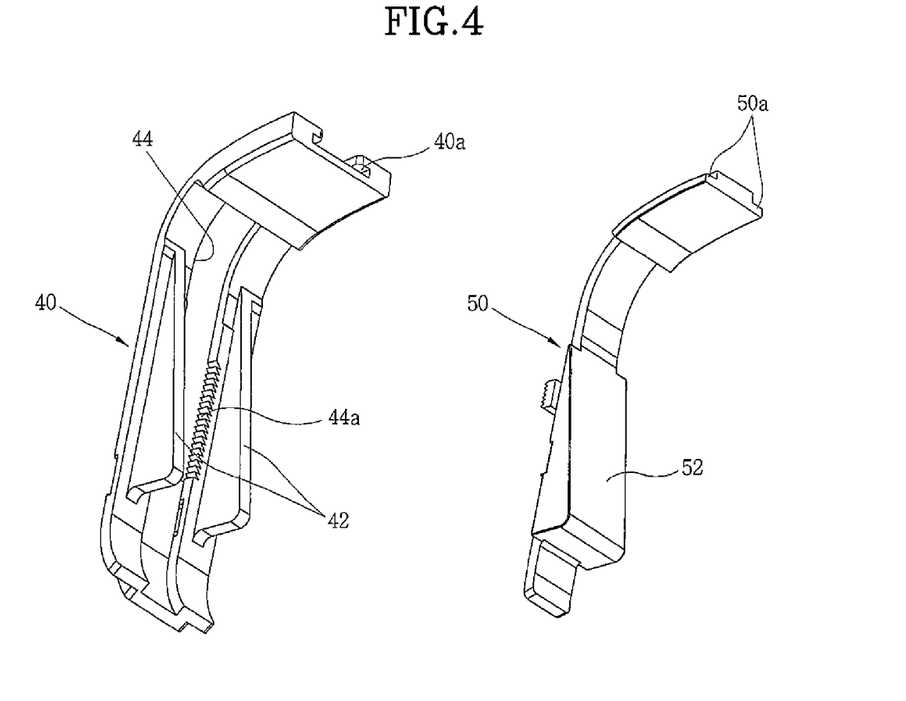
FIG. 4 is a bottom perspective view of FIG. 3.
Figure 5:
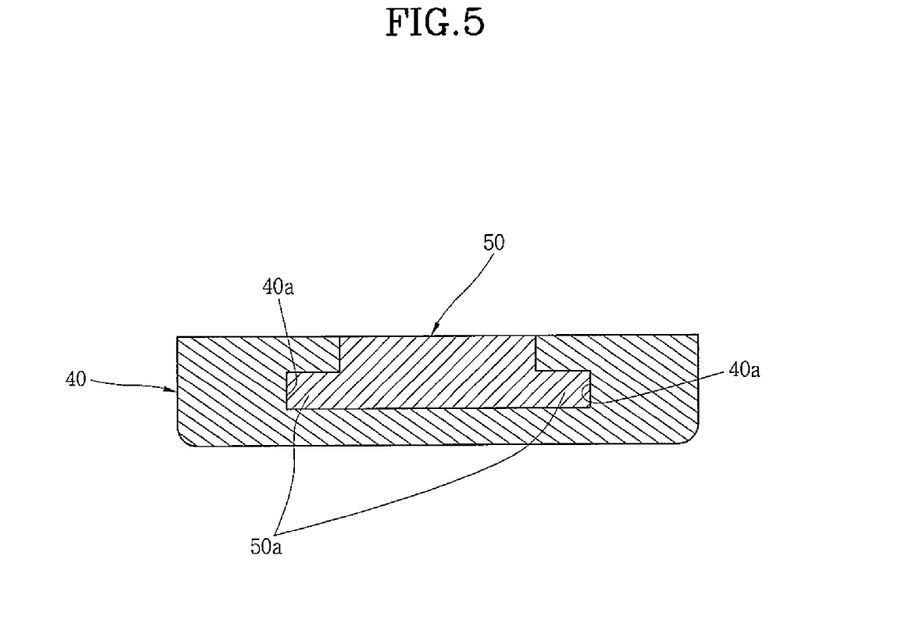
FIG. 5 is a cross-sectional view taken along the line A-A of FIG. 3.

The pedal effort adjusting unit has sloped portions corresponding to each of the large-diameter spring 30*a* and a small-diameter spring 30*b* to adjust the pre-compression force applied to each of the springs, which is described below. That is, as shown in FIGS. 3 to 5, the pedal effort adjusting unit includes an outer sliding member 40 having first sloping bodies 42 that are inclined in one direction, on the lower side, to adjust the pre-compression force to the large-diameter coil spring 30*a* and an inner sliding member 50 having a second sloping body 52 that is also inclined in one direction, on the lower side, to adjust the pre-compression force to the small-diameter coil spring 30*b*. Further, the outer sliding member 40 and the inner sliding member 50 each have a structure that can independently move with respect to the housing 10.

Accordingly, the outer sliding member 40 is movable with respect to a first guide slot 12 that is a long groove formed at the upper portion of the housing 10 and the inner sliding member 50 is movable with respect to a second guide slot 44 that is a long groove formed at the center portion of the outer sliding member 40. The outer sliding member 40 is made of a flexible material that can easily bend to freely move along the first guide slot 12 of the housing 10 and the inner sliding member 50 is also made of a flexible member that can easily bend to freely move along the second guide slot 44 of the outer sliding member 40.

Figure 6:
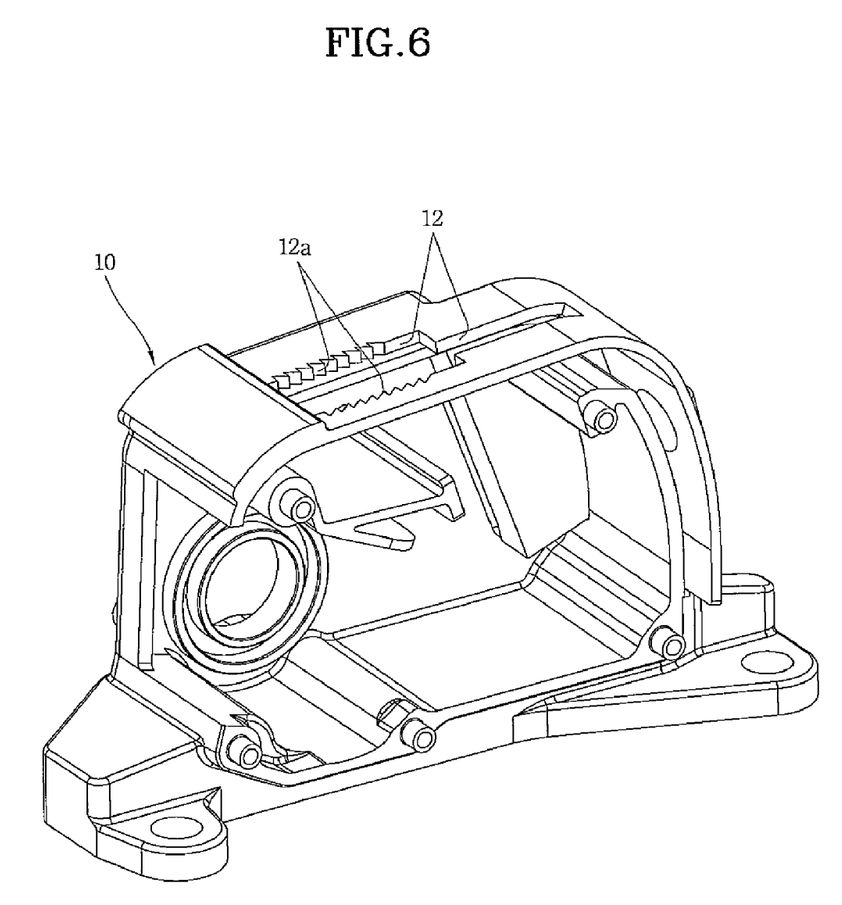
FIG. 6 is a perspective view enlarging only the housing shown in FIG. 2.

As shown in FIG. 6, that is, the outer sliding member 40 and the inner sliding member 50 can freely bend, according to the shape of the housing 10. Further, a first engagement portion 12*a* and a second engagement portion 44*a* each having a plurality of teeth formed in the length direction in a predetermined range are respectively formed on the inner sides of the first guide slot 12 and the second guide slot 44 to adjust the position of the outer sliding member 40 and the inner sliding member 50. In addition, first snaps 46 that are elastically engaged with the first engagement portion 12*a* are integrally formed to a side of the outer sliding member 40 and second snaps 54 that are elastically engaged with the second engagement portion 44*a* are integrally formed to a side of the inner sliding member 50.

Further, a first holder 48 is formed at a side on the outer sliding member 40 and a second holder 56 is formed at a side on the inner sliding member 50, such that the first holder 48 and the second holder 56 respectively facilitate movement of the outer sliding member 40 and the inner sliding member 50. A long stepped groove 40*a* is formed at an end portion of the outer sliding member 40 and a protrusion 50*a* that protrudes outside and is fitted in the stepped groove 40*a* is formed at an end portion of the inner sliding member 50, and both sides of the upper surface of the second sloping body 52 of the inner sliding member 50 are in contact with the lower surface of the second guide slot 44 such that the outer sliding member 40 is not separated upward.

Figure 7:
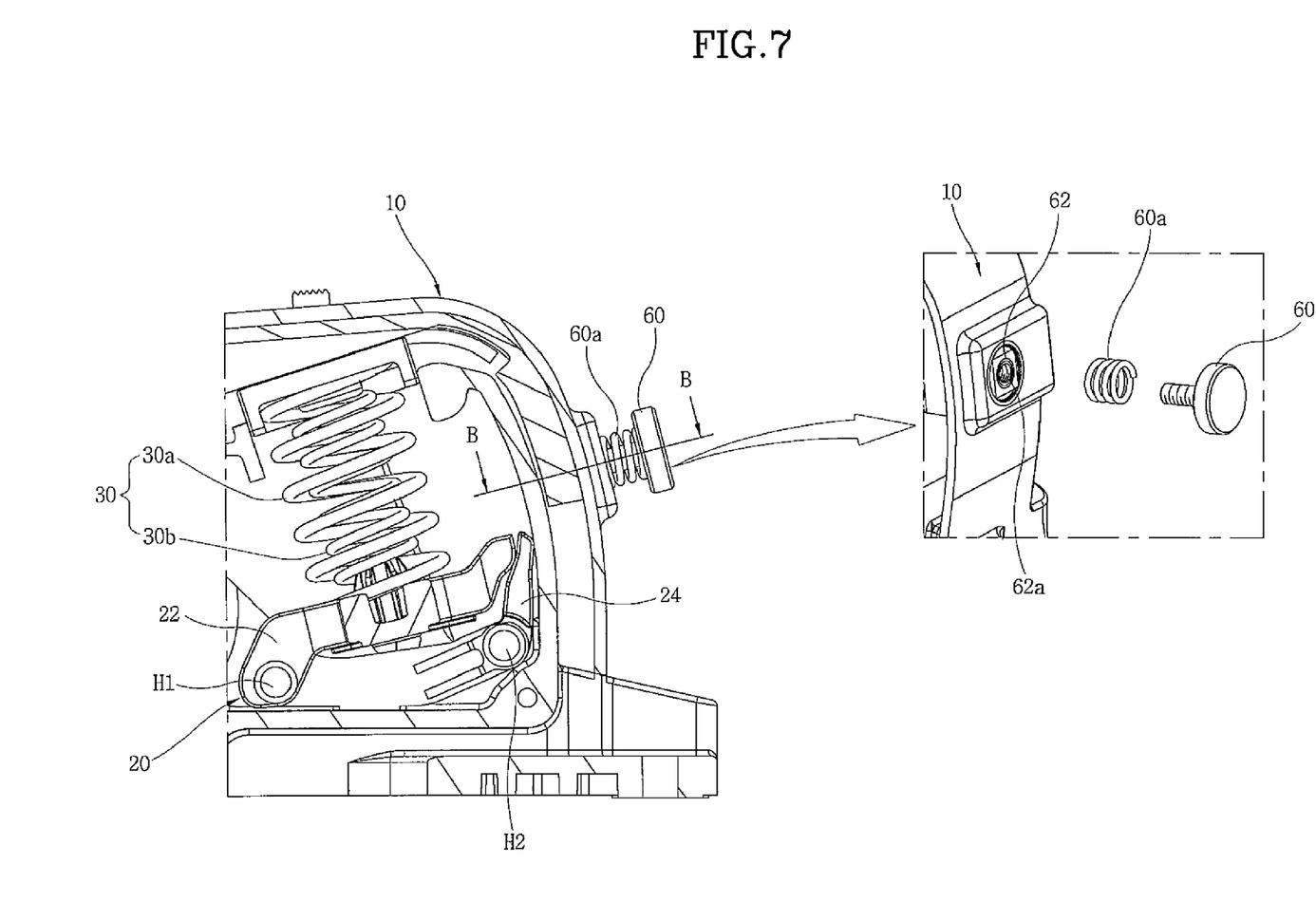
FIG. 7 is a view enlarging only the fastening portion of the fixing screw shown in FIG. 1.
Figure 8:
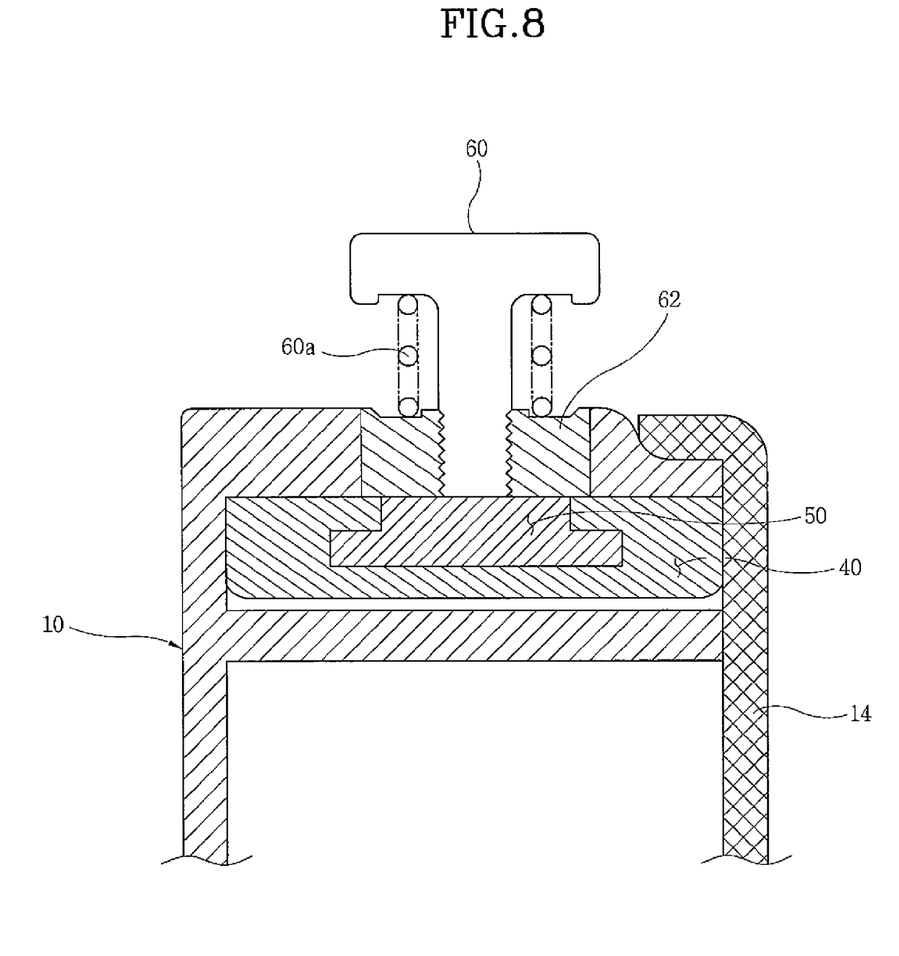
FIG. 8 is a cross-sectional view taken along the line B-B of FIG. 7.

As shown in FIGS. 7 and 8, the pre-compression force setting unit includes a fixing bolt 60 that is inserted through the housing 10. The end of the fixing bolt 60 that has been inserted presses the inner sliding member 50 to fix the inner sliding member 50 and the pressing force applied by the end of the fixing bolt 60 is also transmitted to the outer sliding member 40 through the inner sliding member 50; therefore, the fixing bolt 60 that has been inserted can fix the outer sliding member 40 and the inner sliding member 50. The housing 10 is provided with an adaptor 62 having a bolt hole 62*a* at the center and the fixing bolt 60 is inserted in the bolt hole 62*a*, in which a return spring 60*a* is provided between the adaptor 62 and the fixing bolt 60 when the fixing bolt 60 is inserted in the adaptor 62, such that the fixing bolt 60 can be easily separated from the adaptor 62 by the return force of the return spring 60*a*.

Figure 9:
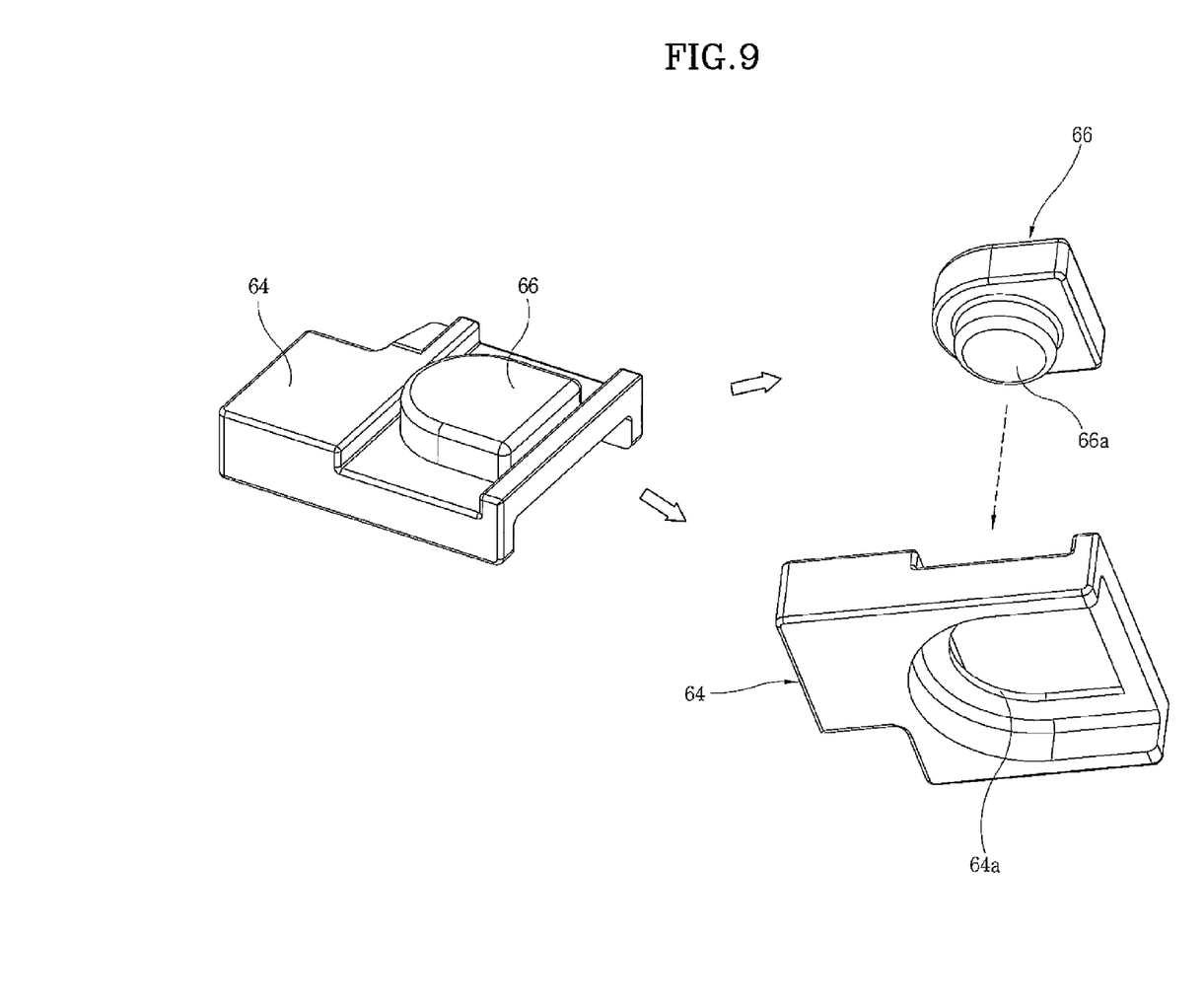
FIG. 9 shows a perspective view and a bottom perspective view respectively illustrating assembly and disassembly of the outer mounting bracket and the inner mounting bracket shown in FIG. 2.

As shown in FIG. 9, the housing 10 is provided with an outer mounting bracket 64 that is pressed by the first sloping bodies 42 of the outer sliding member 40 and correspondingly presses the upper end of the large-diameter coil spring 30*a* and an inner mounting bracket 66 that is pressed by the second sloping body 52 of the inner sliding member 50 and correspondingly presses the upper end of the small-diameter coil spring 30*b*. Therefore, the outer mounting bracket 64 and the inner mounting bracket 66 are pressed against the upper ends of the large-diameter coil spring 30*a* and the small-diameter coil spring 30*b*, respectively, such that they are fixed at predetermined positions in the housing 10.

Figure 11:
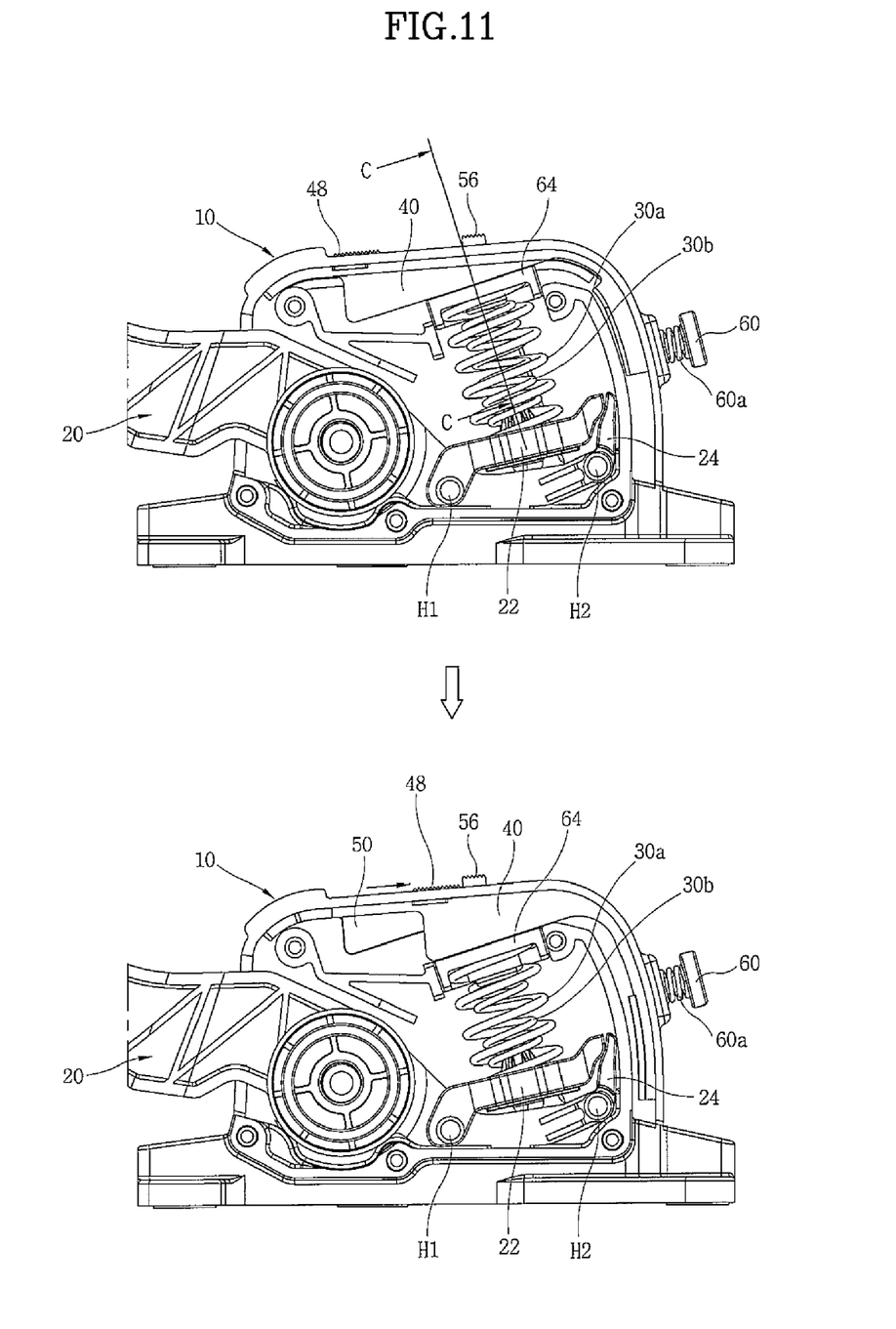
Figure 12:
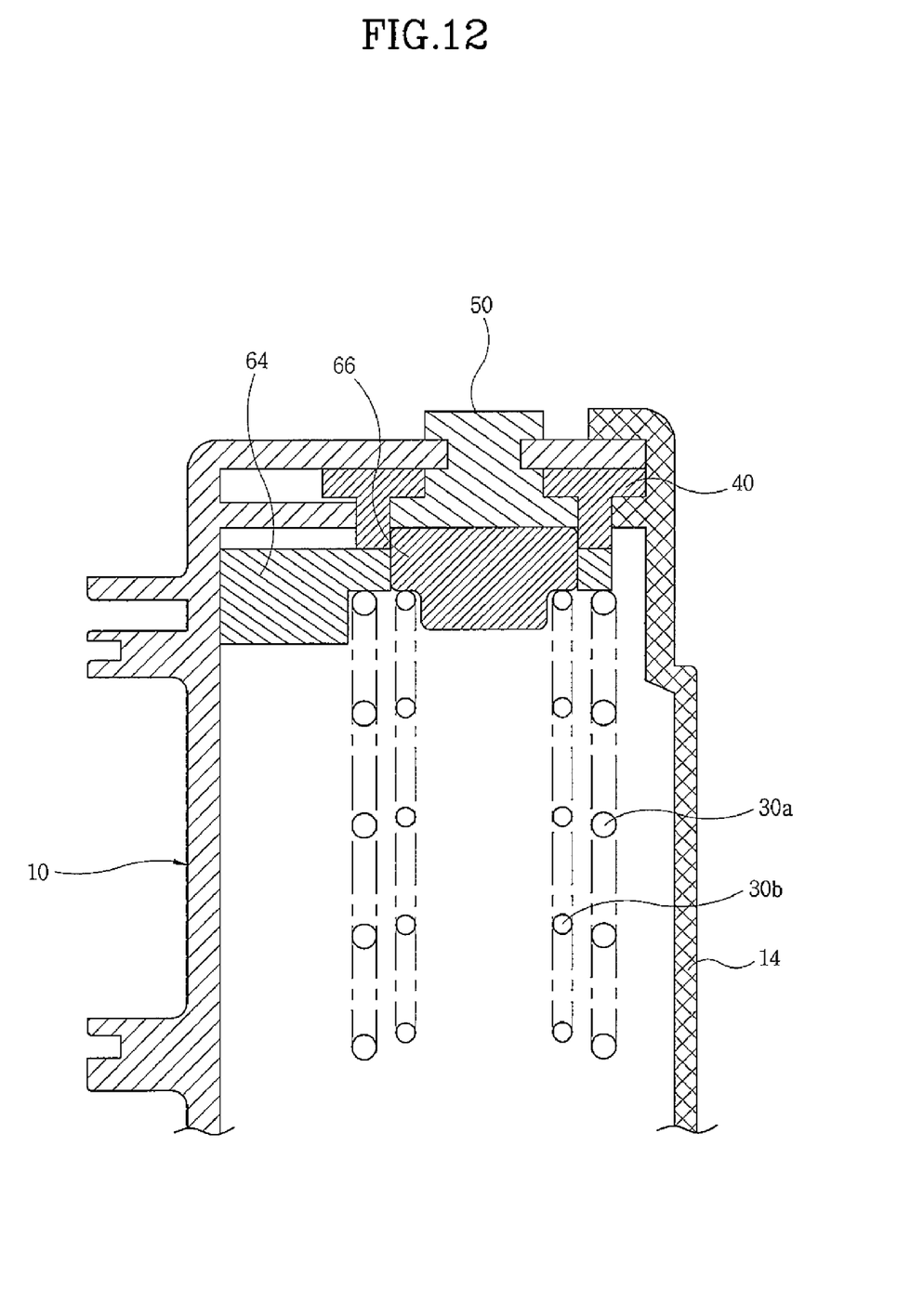
FIG. 12 is a cross-sectional view taken along the line C-C of FIG. 11.

That is, as the outer sliding member 40 and the inner sliding member 50 moves, the outer mounting bracket 64 and the inner mounting bracket 66 separately presses the large-diameter coil spring 30*a* and the small-diameter coil spring 30*b* by the first sloping bodies 42 and the second sloping body 52, the pre-compression force to the coil springs can be adjusted, which can be definitely understood from FIG. 12 showing a cross-section taken along the line C-C of FIG. 11. To achieve the above configuration, a hole 64a is formed through the outer mounting bracket 64 to hold the inner mounting bracket 66 and a protruding boss 66a that is fitted in the small-diameter coil spring 30b and supports the upper end of the small-diameter coil spring 30b is integrally formed on the bottom of the inner mounting bracket 66.

Figure 10:
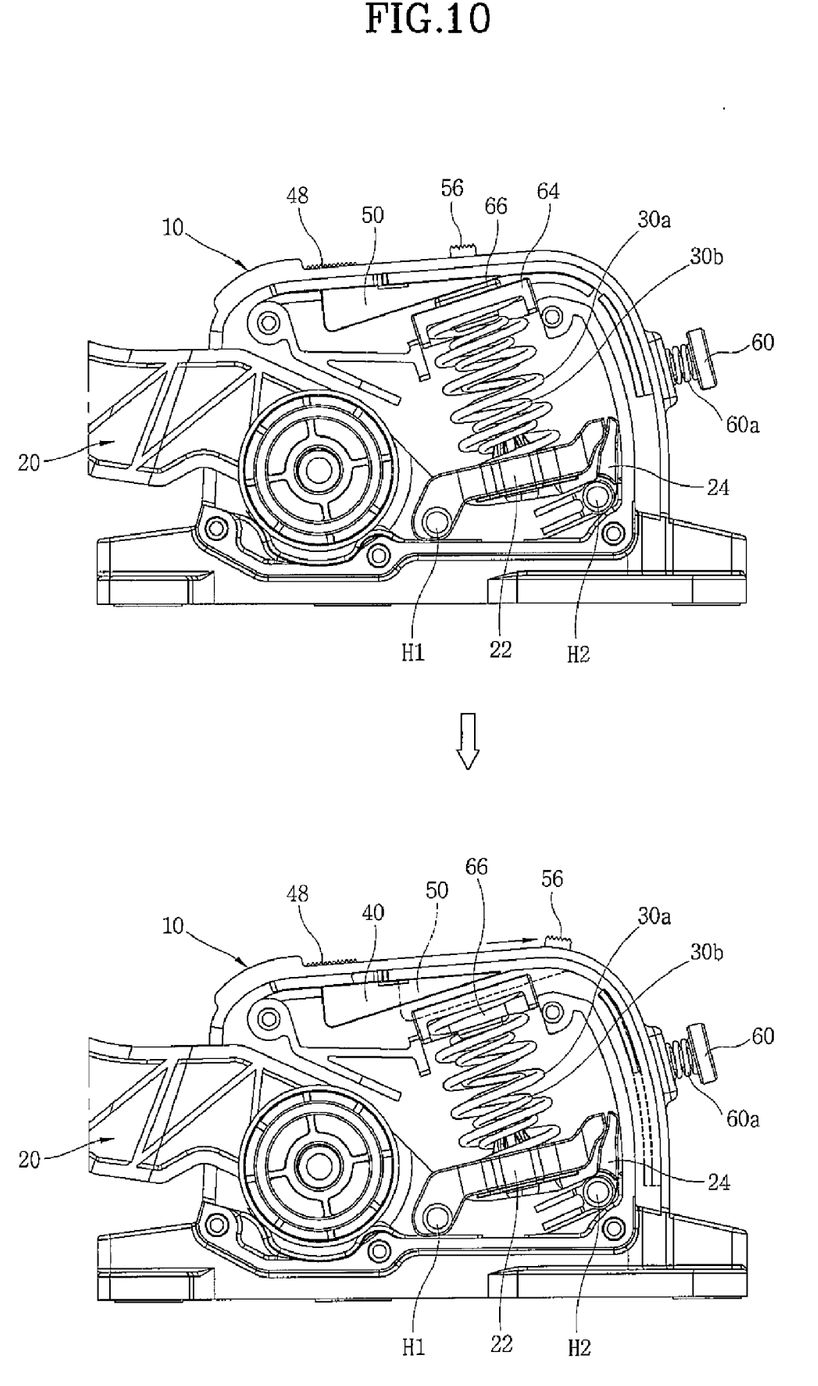
FIGS. 10 and 11 are side views showing a small-diameter coil spring and a large-diameter coil spring before and after a pre-compression force is adjusted, respectively.

As shown in FIGS. 10 and 11, a link member 22 of which an end is hinged to the pedal arm 20 by a first hinge pin H1 to stably support the lower end of the coil spring 30 is provided, and the free end of the link member 22 is supported by the free end a sub-link member 24, of which an end is fixed at a predetermined angle to an end of the pedal arm 20 by a second hinge pin H2. Therefore, the upper ends of the large-diameter coil spring 30a and the small-diameter coil spring 30b are respectively supported by the bottoms of the outer mounting bracket 64 and the inner mounting bracket 66, and the lower ends of the large-diameter coil spring 30a and the small-diameter coil spring 30b is supported by the upper surface of the link member 22.

Further, as shown in FIG. 2, the link member 22 has a locking step 22a that holds and supports the outside of the lower end of the large-diameter coil spring 30a and a protruding boss 22b that is fitted in the small-diameter spring 30b and supports the inside of the lower end of the small-diameter spring 30b, in which the locking step 22a and the protruding boss 22b are integrally formed with the link member 22. Accordingly, the lower ends of large-diameter coil spring 30a and the small-diameter coil spring 30b are spaced apart from each other at the pivot end of the link member 22.

Meanwhile, the coil spring 30 is initially disposed such that the axis is perpendicular to the sloped portion of the pedal effort adjusting unit. That is, the upper end of the coils spring 30 perpendicularly contacts with the outer mounting bracket 44 and the inner mounting bracket 66 that separately contact with the first sloping bodies 42 of the outer sliding member 40 and the second sloping body 52 of the inner sliding member 50, and the lower end of the coil spring 30 perpendicularly contacts with the link member 22. Accordingly, as the pedal effort adjusting unit operates and the outer sling member 40 and the inner sliding member 50 correspondingly move, the large-diameter coil spring 30a and the small-diameter coil spring 30b can be accurately compressed and expanded in the axial direction by the first sloping bodies 42 and the second sloping body 52.

Further, as shown in FIG. 2, a cover plate 14 is fastened to a side of the housing 10 by a plurality of bolts B to accommodate the coil spring 30, the outer sliding member 40, the inner sliding member 50, the outer mounting bracket 64, and the inner mounting bracket 66, such that the cover plate 14 prevents the parts from being separated outside the housing 10 by being fastened after the coil spring 30, the inner and outer sliding members 40, 50, and the inner and outer mounting brackets 64, 66 are disposed in the housing 10.

The operation of the pedal device with a function of adjusting pedal effort according to an embodiment of the invention is described hereafter. First, as shown in FIG. 10, as the inner sliding member 50 moves with respect to the guide slot 44 of the outer sliding member 40, the second sloping body 52 of the outer sliding member 40 presses down the inner mounting bracket 66 and the small-diameter coil spring 30b is compressed with the pre-compression force increased.

Further, as shown in FIG. 11, as the outer sliding member 40 moves with respect to the first guide slot 12 of the housing 10, the first sloping bodies 42 of the outer sliding member 40 presses down the outer mounting bracket 64 and the large-diameter coil spring 30a is compressed with the pre-compression force increased. Further, it should be understood that the fixing bolt 60 is first separated from the housing 10 to adjust the pedal effort of the pedal device according to an embodiment of the invention that operates as described above.

Further, after the pre-compression force of the large-diameter coil spring 30a or the small-diameter coil spring 30b is selectively adjusted as the outer sliding member 40 or the inner sliding member 50 moves, the adjusted pre-compression force applied to the elastic member is maintained by inserting again the fixing bolt 60 into the housing 10 to set the fixed position of the pedal effort adjusting unit with respect to the housing 10.

Figure 13:
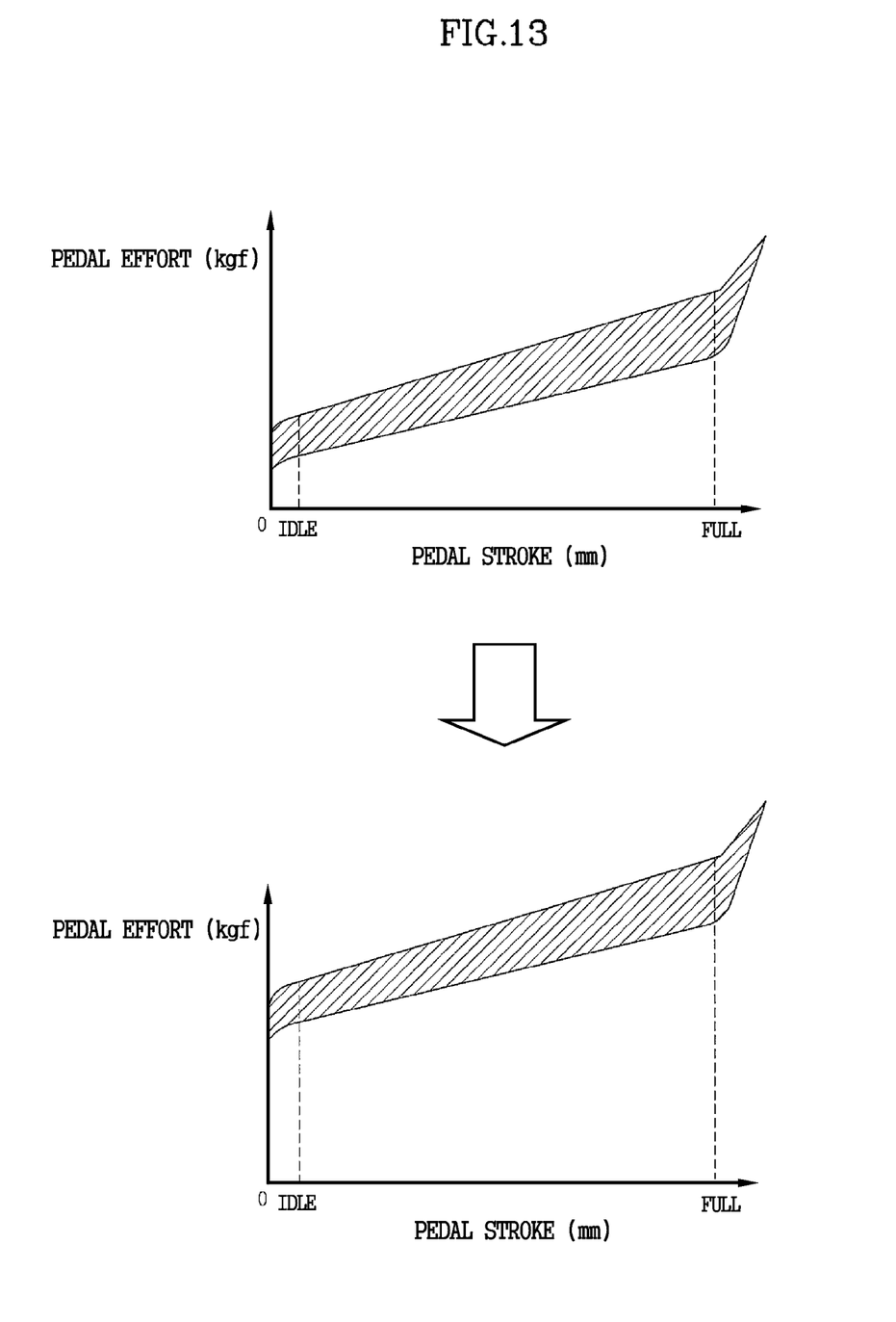
FIG. 13 shows graphs illustrating changes in stroke-to-pedal effort before and after a pedal effort is adjusted, when a pedal operates.

Therefore, as the pedal effort against the pedal arm 20 is adjusted as described above, as shown in FIG. 13, pedal effort-to-pedal stroke can be variably adjusted, in which the change of pedal effort-to-pedal stroke makes it possible to appropriately adjust the position of the outer sliding member 40 with respect to the first guide slot 12 of the housing 10 or the position of the inner sliding member 50 with respect to the second guide slot 44 of the outer sliding member 40, within a small range.

As described above, according to a pedal device with a function of adjusting pedal effort of the invention, it is possible to adjust the reaction force applied to the driver pressing the pedal to correspond to the driver's driving propensity by adjusting the pre-compression force against the return spring providing the return force to the pedal arm, such that it is possible to improve the operability and reduce the fatigue of the driver's ankle.

Further, according to a pedal device with a function of adjusting pedal effort of the invention, a product performance can be stabilized by reducing the dispersion of a quality in producing the pedal device through flexible and accurate adjustment of the pedal effort of the pedal device and tuning of operability according to output characteristics of the engine can be easily performed when the pedal device is applied to vehicles of different type vehicles.

What is claimed is:

1. A pedal device with a function of adjusting pedal effort comprising:

a housing that is fixed to a car body;

a pedal arm that is hinged to the housing and pivots about the housing;

an elastic member that is disposed between the housing and the pivot end of the pedal arm and provides a return force to the pedal arm;

a pedal effort adjusting unit that is movably disposed in the housing and has a sloped portion for adjusting a precompression force to the elastic member; and a pre-compression force setting unit that sets a fixed position of the pedal effort adjusting unit with respect to the housing and keeps a pre-compression force applied to the elastic member at a predetermined level, wherein the elastic member is a coil spring composed of a large-diameter spring and a small-diameter spring that is coaxially disposed at a predetermined distance inside the large-diameter spring, and the pedal effort adjusting unit includes an outer sliding member having first sloping bodies on the lower side to adjust the pre-compression force to the large-diameter coil spring, and an inner sliding member having a second sloping body on the lower side to adjust the pre-compression force to the small-diameter coil spring.

2. The pedal device as set forth in claim 1, wherein the elastic member is disposed such that the axis of the elastic member is perpendicular to the sloped portion of the pedal effort adjusting unit.

3. The pedal device as set forth in claim 1, wherein the outer sliding member is disposed movably with respect to a first guide slot formed at the housing and the inner sliding member is disposed movably with respect to a second guide slot formed at the outer sliding member.

4. The pedal device as set forth in claim 3, wherein a first engagement portion is formed on the inner sides of the first guide slot to adjust the position of the outer sliding member, first snaps that are elastically engaged with the first engagement portion are formed the outer sliding member, a second engagement portion is formed on the inner sides of the second guide slot to adjust the position of the inner sliding member, and second snaps that are elastically engaged with the second engagement portion are formed to the inner sliding member.

5. The pedal device as set forth in claim 3, wherein a stepped groove is formed at an end portion of the outer sliding member, a protrusion that is fitted in the stepped groove is formed at an end portion of the inner sliding member, and both sides of an upper surface of the second sloping body of the inner sliding member are stably supported by a lower surface of the second guide slot of the outer sliding member.

6. The pedal device as set forth in claim 1, wherein a first holder is formed at a side on the outer sliding member and a second holder is formed at a side on the inner sliding member.

7. The pedal device as set forth in claim 1, wherein the pre-compression force setting unit includes a fixing bolt that is inserted in the housing and provides a pressing force to the inner sliding member.

8. The pedal device as set forth in claim 7, wherein the fixing bolt is inserted in an adaptor that is fixed to the housing and has a bolt hole at the center.

9. The pedal device as set forth in claim 1, wherein the housing is provide with an outer mounting bracket that is in surface contact with the first sloping bodies of the outer sliding member and an inner mounting bracket that is surface contact with the second sloping body of the inner sliding member.

10. The pedal device as set forth in claim 9, wherein a hole is formed through the outer mounting bracket to hold the inner mounting bracket, and a protruding boss that is fitted in the small-diameter coil spring and supports an upper end of the small-diameter coil spring is integrally formed on a lower side of the inner mounting bracket.

11. The pedal device as set forth in claim 10, wherein a link member of which an end is hinged to the pedal arm to stably support a lower end of the coil spring is provided, and a free end of the link member is supported by the free end of a sub-link member of which an end is fixed to an end of the pedal arm by a hinge.

12. The pedal device as set forth in claim 11, wherein the upper ends of the large-diameter coil spring and the small diameter coil spring are separately supported by bottoms of the outer mounting bracket and the inner mounting bracket, and lower ends of the large-diameter coil spring and the small-diameter coil spring are stably supported by an upper surface of the link member.

13. The pedal device as set forth in claim 11, wherein the link member has a locking step that holds and supports an outside of the lower end of the large-diameter coil spring and a protruding boss that is fitted in the small-diameter spring and supports an inside of the lower end of the small-diameter spring.

14. The pedal device as set forth in claim 9, wherein a cover plate is fastened to a side of the housing to accommodate the coil spring, the outer sliding member, the inner sliding member, the outer mounting bracket, and the inner mounting bracket.

* * * * *